UNITED STATES PATENT OFFICE.

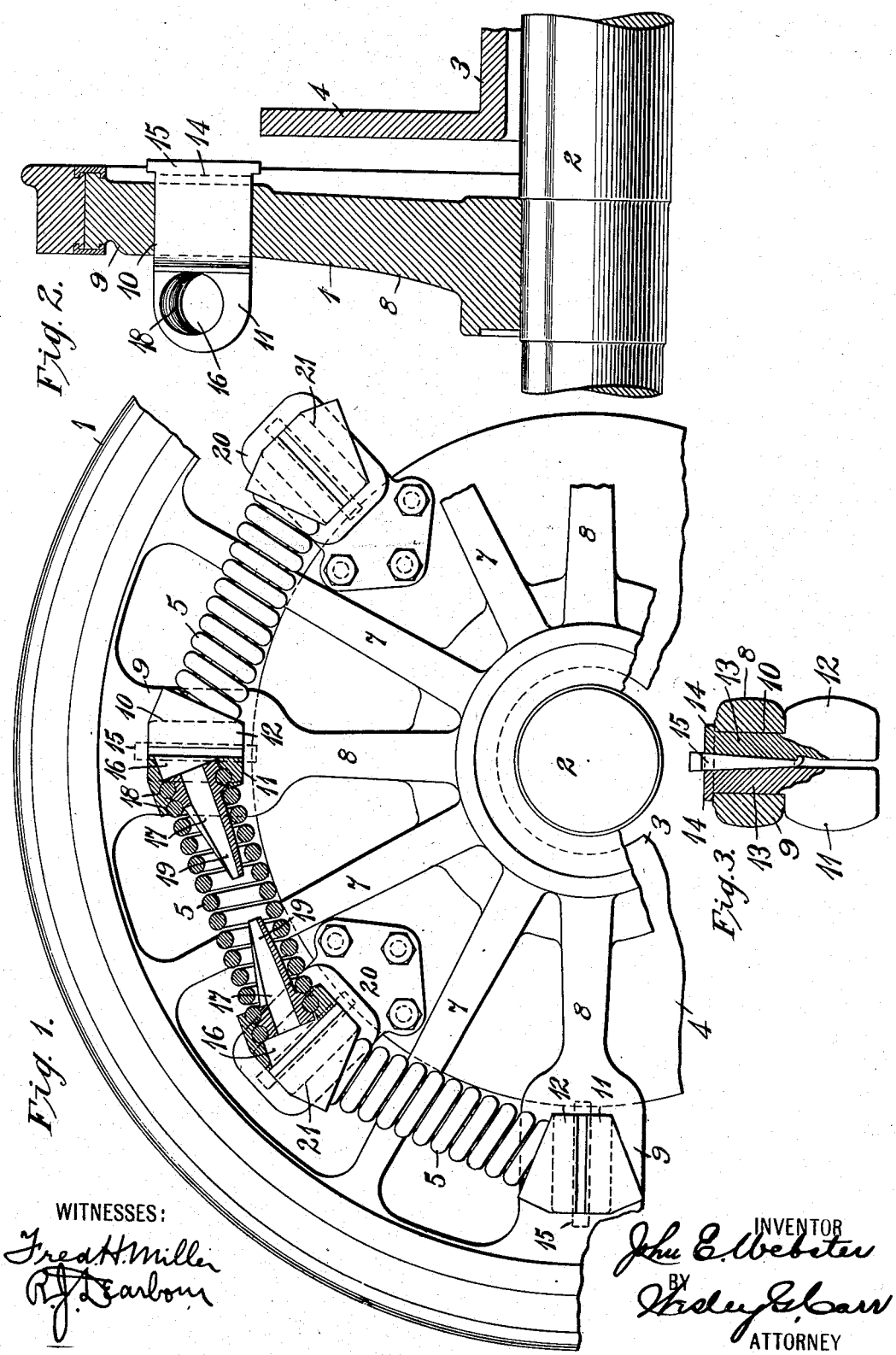

JOHN E. WEBSTER, OF PITTSBURG, PENNSYLVANIA, ASSIGNOR TO WESTINGHOUSE ELECTRIC & MANUFACTURING COMPANY, A CORPORATION OF PENNSYLVANIA.

RESILIENT DRIVING CONNECTION.

937,347.      Specification of Letters Patent.      Patented Oct. 19, 1909.

Application filed December 31, 1908. Serial No. 470,231.

*To all whom it may concern:*

Be it known that I, JOHN E. WEBSTER, a citizen of the United States, and a resident of Pittsburg, in the county of Allegheny and State of Pennsylvania, have invented a new and useful Improvement in Resilient Driving Connections, of which the following is a specification.

My invention relates to resilient driving connections and it has for its object to provide a yielding connection between a quill or sleeve, on which a driving motor is mounted, and a truck axle which forms a part of a locomotive or other propelling vehicle.

When electric driving motors are mounted concentrically with the axles of the locomotive or other vehicle, in connection with which they are employed, it is desirable to provide a resilient or yielding connection between the motor armatures and the vehicle wheels in order to minimize the strains imposed upon the track by the heavy locomotive operating at high speed and on the vehicle structure by the irregularities in the road bed.

According to my present invention, I provide a plurality of springs which are tangentially disposed, end to end, between the hub and the rim of the vehicle wheel, in the form of a polygon, one end of each spring being secured to a projection on a spoke of the wheel and the opposite end being connected to a projection on a sleeve or quill which surrounds the truck axle.

Figure 1 of the accompanying drawings is a view, partially in elevation and partially in section, of a portion of a resilient driving connection constructed in accordance with my invention, Fig. 2 is a transverse sectional elevation of the parts shown in Fig. 1 and Fig. 3 is a detail view showing a convenient means for attaching the spring supports to the projections with which the wheel and the quill are provided.

Referring to the drawings, the structure illustrated comprises a vehicle wheel 1, an axle 2, a sleeve or quill 3 having an annular flange or projection 4 and a plurality of tangentially arranged springs 5 which form a yielding connection between the wheel and the quill and a support for the latter.

The wheel 1 comprises a plurality of radial spokes 7 and 8, of which the spokes 8 are provided with enlargements 9 having rectangular recesses 10 in which spring supports 11 and 12 are seated. Since the springs 5 are arranged end to end, the spring supports 11 and 12 are arranged in pairs and are provided with projections 13 which are adapted to extend through the recesses 10 and have flanges 14 which prevent them from being detached from the wheels accidentally, when they are assembled in position, as shown in Fig. 3, and when wedges 15 are forced between them.

The spring supports 11 and 12 are provided with holes 16 the walls of which are grooved to receive the ends of the spring, and with plugs 17 which are forced into the ends of the springs to hold them in position, in accordance with the arrangement more fully illustrated and described in my copending application, Serial No. 426,344, filed April 10, 1908. The inner surfaces of the spring supports 11 and 12 and the outer surfaces of the plugs 17 are provided with helical grooves 18 which conform to the contour of the springs. The plugs 17 are provided with guide projections 19 which extend material distances into the springs, adjacent to the parts of the helices which are nearer the center of the wheel.

The sleeve or quill 3 is provided with a plurality of brackets 20, which are secured to the flange or annular projection 4, and correspond to the enlargements 9 of the spokes 8, they being similarly provided with recesses 21 to receive corresponding spring supports 11 and 12. The brackets 20 correspond in number to the spokes 8 and both these parts are symmetrically arranged about the axis of the wheel, the brackets 20 being located half way between adjacent spokes 8 so that one end of one spring is connected to one of the spokes and the corresponding end of the next adjacent spring is connected to one of the brackets.

It has been found that when springs are tangentially disposed on rotating parts, the centrifugal forces to which they are subjected tend to throw the center of the spring outward and, in some cases, the turns of the springs are broken. This difficulty is entirely avoided by using the structure of my present invention since the projection 19 of the plug 17 serves to support the turns of the spring at the points where a support is most needed. At the same time, the guide projections do not, in any way, interfere with the resiliency of the connection between the quill and the wheel.

While the structure illustrated is considered to be specially desirable, it is evident that modifications may be effected within the spirit and scope of my invention, and I desire that only such limitations shall be imposed as are indicated in the appended claims.

I claim as my invention:

1. A resilient driving connection comprising two adjacent rotatable members capable of independent movement and having opposing projections, a plurality of helical springs each of which surrounds two of said opposing projections and is rigidly fastened thereto.

2. A resilient driving connection comprising two independently rotatable members having rigid opposing projections, a plurality of helical springs each of which surrounds two of said projections and is rigidly fastened thereto.

3. A resilient driving connection comprising two independently rotatable members having tangentially disposed opposing projections, a plurality of helical springs each of which surrounds two of said opposing projections and is rigidly fastened thereto.

4. A resilient driving connection comprising a truck axle, a wheel secured thereto, a sleeve or quill surrounding the axle, a plurality of helical springs interposed tangentially between the wheel and the quill, and tangentially disposed opposing projections on said wheel and said quill which are surrounded by said springs and are rigidly fastened to the ends thereof.

5. A resilient driving connection comprising a truck axle, a wheel secured thereto, a sleeve or quill surrounding the axle and having a plurality of radial arms alternating in position with the spokes of the wheel, a plurality of helical springs interposed tangentially between the arms of the sleeve or quill and the spokes of the wheel, and opposing projections to which said springs are rigidly clamped and which serve to prevent radial displacement thereof.

6. A resilient driving connection comprising a truck axle, a wheel secured thereto, a sleeve or quill surrounding the axle and having a plurality of radial arms which alternate in position with the spokes of the wheel, a plurality of helical springs arranged end to end in the form of a polygon and interposed between the quill arms and the wheel spokes, and opposing projections to which the ends of the springs are rigidly fastened and which serve to prevent radial displacement of intermediate convolutions thereof.

7. A resilient driving connection comprising a truck axle, a wheel secured thereto, a sleeve or quill surrounding the axle and having a plurality of radial arms, a plurality of helical springs arranged end to end in the form of a polygon and interposed between the quill arms and the wheel spokes, and projections to which the ends of the springs are rigidly clamped and which extend thereinto adjacent to the inner sides thereof to prevent the outward radial displacement of their convolutions.

In testimony whereof, I have hereunto subscribed my name this 21st day of December, 1908.

JOHN E. WEBSTER.

Witnesses:
   J. D. FARRER,
   BIRNEY HINES.